United States Patent [19]
Tasaka et al.

[11] Patent Number: 5,337,099
[45] Date of Patent: Aug. 9, 1994

[54] LENS-FITTED PHOTOGRAPHIC FILM UNIT WITH FLASH DEVICE AND BATTERY-INSULATING WRAPPER

[75] Inventors: Hisashi Tasaka; Hidefumi Obo; Takashi Kubo; Kazuo Kamata, all of Saitama, Japan

[73] Assignee: Fuji Photo Film Co., Ltd., Kanagawa, Japan

[21] Appl. No.: 84,717

[22] Filed: Jul. 1, 1993

[30] Foreign Application Priority Data

Jul. 1, 1992 [JP] Japan ................... 4-174358
Jul. 14, 1992 [JP] Japan ................... 4-187072
Jul. 23, 1992 [JP] Japan ................... 4-197308

[51] Int. Cl.⁵ ........................................ G03B 29/00
[52] U.S. Cl. ........................ 354/76; 206/316.2
[58] Field of Search ........... 354/75, 76, 145.1, 149.11, 354/485; 206/316.2; 224/908

[56] References Cited

U.S. PATENT DOCUMENTS

| | | | |
|---|---|---|---|
| 4,739,353 | 4/1988 | Heuer et al. | 354/76 |
| 4,884,087 | 11/1989 | Mochida et al. | 354/75 |
| 4,896,178 | 1/1990 | Ohmura et al. | 354/145.1 |
| 4,954,858 | 9/1990 | Ohmura et al. | 354/145.1 |

*Primary Examiner*—Howard B. Blankenship
*Attorney, Agent, or Firm*—Young & Thompson

[57] ABSTRACT

A lens-fitted photographic film unit has a flash device for emitting a flash of light. A charge switch is adapted to bring the flash device into an on-state, either by rotation of a film advancing wheel, or when a shutter device is cocked. When the flash device is in the on-state, a main capacitor is charged so as to allow emission of a flash of light. In a preferred embodiment, the charge switch is initially turned on so as to keep the flash device in the on-state. In another preferred embodiment, the flash device is in the on-state while the charge switch is on, and is in the off-state while the charge switch is off, in response to the shutter device. When the lens-fitted photographic film unit is contained in a wrapper, an insulating tape is inserted between a positive electrode of the battery and a contact segment. Upon the wrapper being torn off the lens-fitted photographic film unit, the insulating tape is pulled out of the lens-fitted photographic film unit, so as to bring the flash device into the on-state.

7 Claims, 8 Drawing Sheets

LENS-FITTED PHOTOGRAPHIC FILM UNIT WITH FLASH DEVICE AND BATTERY-INSULATING WRAPPER

BACKGROUND OF THE INVENTION

1. Field of the Invention

The present invention relates to a lens-fitted photographic film unit with a flash device, and more particularly to a lens-fitted photographic film unit in which the flash device emits a flash for each exposure.

2. The Known Prior Art lens-fitted photographic film units (hereinafter simply referred to as film units) are widely known and sold at low prices. As disclosed in U.S. Pat. No. 4,884,087, such a film unit consists of a film housing having a preloaded photographic film and a photograph-taking mechanism, and a decorative outer casing in which the film housing is encased. Furthermore, the film unit is enclosed in a wrapping having a hang hole by which the film unit is hung on a hanger for display at a shop.

After purchasing the film unit and removing its wrapping by tearing, photographs can be taken with the film housing encased in the outer casing. When available frames of the photographic film are entirely exposed, the film unit in its entirety is forwarded to a photo-finishing agency for development.

There are also known film units having a flash device including a flash circuit, a flash button, a dry cell battery and the like. When a flash photograph is desired, a flash button is depressed to charge main and trigger capacitors in the flash circuit. The flash button is kept depressed until the completion of the charging can be ascertained by lighting of a pilot lamp. Then, the flash button is released and upon depression of a shutter release button, a trigger switch for generating a trigger signal is turned on to cause the trigger capacitor to be discharged, when the shutter blade is fully open. Accordingly, when high voltage is applied to a trigger electrode for a flash discharge tube by the trigger circuit, the current from the main capacitor flows into the flash discharge tube to emit a flash. The depression and release of the flash button can be repeated as needed.

However, this operation of depressing and releasing the flash button is troublesome for users. Therefore, users are liable to forget to carry out this operation or to discontinue it before the pilot lamp is lit, resulting in under-exposed frames. It would be possible to always turn on a booster circuit of the flash device, taking advantage of the single-use characteristics of film units. But it is not appropriate to do so from the moment of shipment since the lifetime of the battery is limited.

OBJECTS OF THE INVENTION

It is an object of the present invention to provide a lens-fitted photographic film unit in which a flash is emitted for each photograph without necessitating any troublesome manual operation for charging.

It is another object of the present invention to provide a lens-fitted photographic film unit wherein when a user starts to use the unit, continuous charging of a flash device is begun.

In order to achieve the above and other objects and advantages of the present invention, a novel lens-fitted photographic film unit has switching means that are switched by the operation of advancing the photographic film. The switching means brings a flash device into an on-state. When the flash device is in the on-state, a main capacitor is charged in order to stand by for flash photography. It is possible according to the present invention to effect flash photography automatically, without manually operating a flash charging switch. No exposures will be lost, because the flash device is charged while standing by for taking a photograph. The flash device as shipped from a factory is not in the on-state before sale, so that no drain on the battery, due to natural discharge or leaking, takes place.

In a preferred embodiment of the present invention, a novel film unit is provided with a cam formed on a film advancing wheel, a charge starting switch turned on/off by the cam, and self-maintaining means for keeping the flash device in an on-state by coming into a self-maintained state after the charge starting switch is first turned on. In this embodiment, the flash device is turned on only slightly before taking a first photograph with the film unit, so as to avoid discharge of the battery during manufacture and transportation of the film unit.

In another preferred embodiment of the present invention, a novel film unit is provided with a charge switch turned on only when the shutter actuating lever is shifted into a cocked position. While the charge switch is turned on, the flash device is in the on-state. When the shutter actuating lever is shifted into the uncocked position by releasing the shutter, the charge switch is turned off so as to bring the flash device into the off-state. In this embodiment, the flash device is in the on-state only when standing by to take the next photograph, so as to use the battery in a more effective manner.

A novel film unit according to the present invention is marketed as packaged in a tubular wrapping. During wrapping, insulating tape is inserted between a contact segment and one of the electrodes of the battery, preferably the positive electrode, so as to avoid electrical contact of the battery with the flash device. When the wrapper is torn off the lens-fitted film unit, the insulating tape is drawn out of the film unit to allow direct contact of the positive electrode of the battery with the contact segment. This direct contact brings the flash device into the on-state. Accordingly, the flash device is brought into the on-state only a short time before use of the film unit, so that unnecessary discharge of the battery is prevented. No special operation for bringing the flash device into the on-state is required.

BRIEF DESCRIPTION OF THE DRAWINGS

The above and other objects and advantages of the invention will become apparent from the following description of preferred embodiments when read in conjunction with the accompanying drawings, wherein like reference characters designate like or corresponding parts throughout fine several views, and in which.

DETAILED DESCRIPTION OF THE PREFERRED EMBODIMENTS

Figure 1:
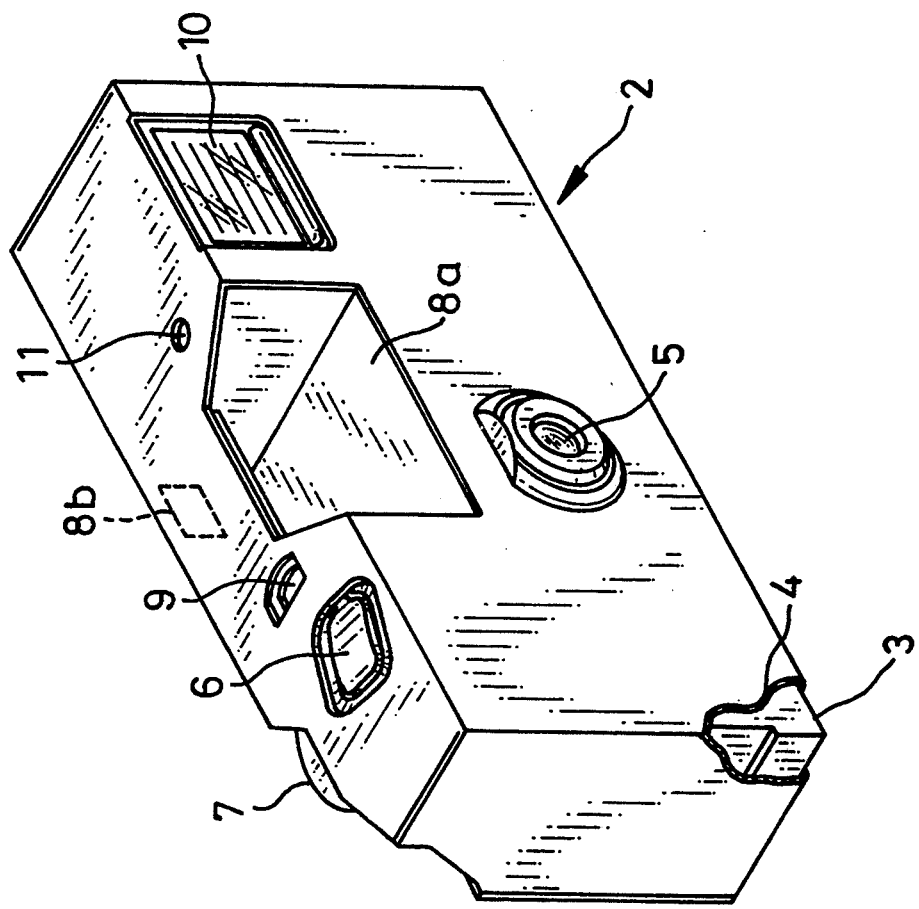
FIG. 1 is a front perspective view of a lens-fitted photographic film unit according to this invention.

Referring to FIG. 1, a lens-fitted photographic film unit 2 consists of a film housing 3 formed chiefly of plastic and an outer casing 4 in which the film housing 3 is encased. The outer casing 4 is formed of a cardboard or the like with illustrations and information printed thereon for ornamental and informative purposes. The outer casing 4 has openings for exposing a taking lens 5, a shutter release button 6, a film advancing wheel 7, front and rear finder windows 8a, 8b, a film frame counter window 9, a flash window 10 and a pilot lamp 11. Therefore, photographs can be taken with the film housing 3 encased in the outer casing 4.

Figure 2:
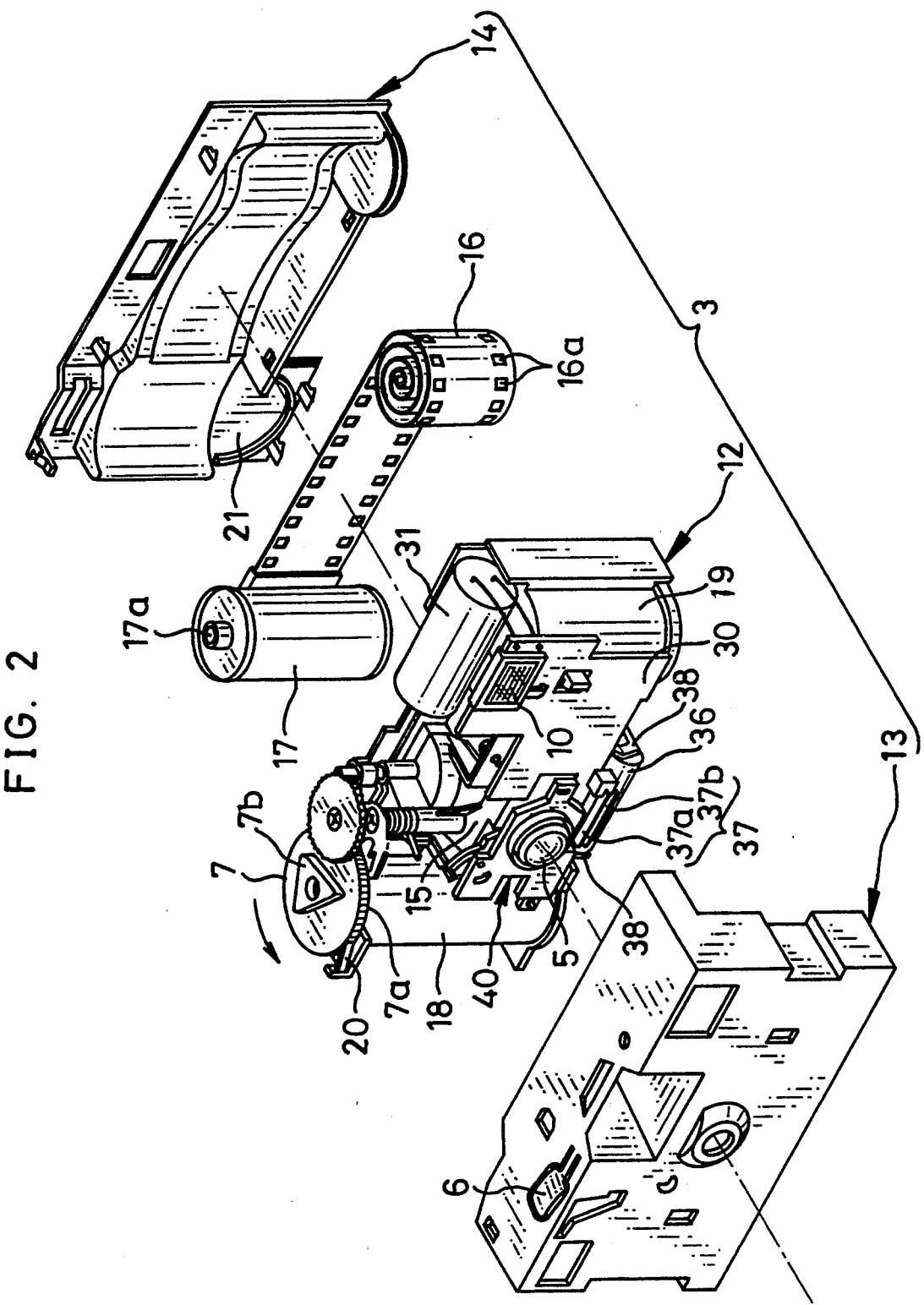
FIG. 2 is an exploded perspective view of a film housing of the film unit in FIG. 1.

Referring to FIG. 2, the film housing 3 comprises a main body 12, a front cover 13 and a rear cover 14. The main body 12 has a film take-up chamber 18 and a film supply chamber 19 on opposite sides of an exposure chamber 15. In its assembly, a cassette 17 and a roll of 135-type (35 mm in width) photographic film 16 which has been drawn out of the cassette 17 are accommodated respectively in the film take-up chamber 18 and the film supply chamber 19. The trailer of the photographic film 16 is fixed to a spool 17a which is contained rotatably in the cassette 17. A photo-taking unit 40 with the taking lens 5 is provided in front of the exposure chamber 15. As is well known, light passing through the taking lens 5 falls on the photographic film 16.

On the top of the film take-up chamber 18 is disposed the film advancing wheel 7 having a fork (not illustrated) which is coupled with the spool 17a. When the film advancing wheel 7 is rotated in a direction indicated by an arrow, the spool 17a is rotated in the same direction, whereby an exposed portion of the photographic film 16 is rewound into the cassette 17. The film advancing wheel 7 is provided on its periphery with teeth 7a with which a pawl 20 of a leaf spring is engaged to prevent reverse rotation of the film advancing wheel 7.

Figure 3:
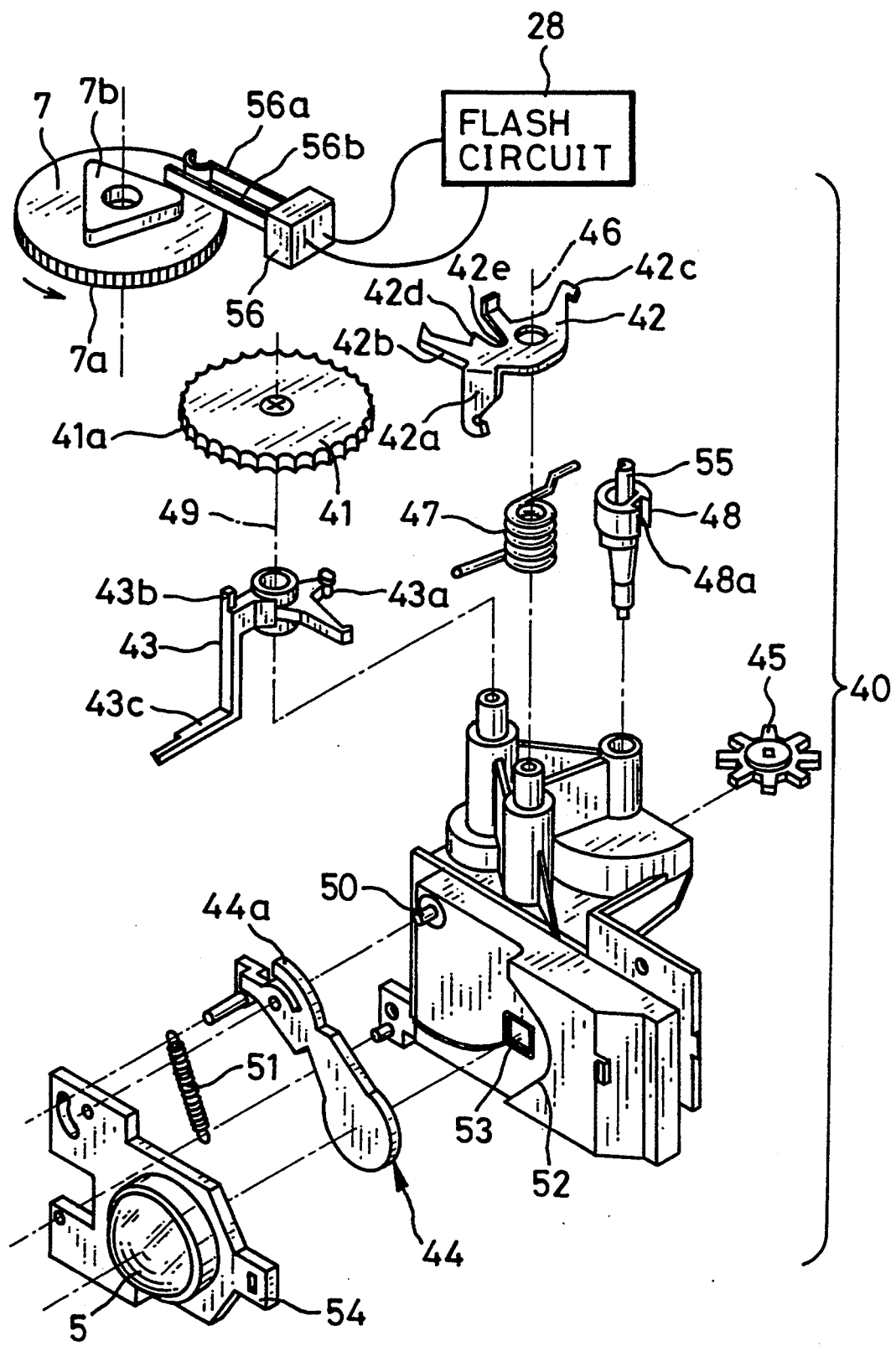
FIG. 3 is an exploded perspective view of a phototaking unit of the film unit.

Referring to FIG. 3, the photo-taking unit 40 comprises an arresting lever 42, a shutter actuating lever 43, a shutter blade 44, a driven sprocket wheel 45 and the like. The arresting lever 42 is swingable around an axis 46 and its bent arm 42a is biased clockwise by a spring 47 provided under the arresting lever 42. The bent arm 42a of the arresting lever 42 contacts a rod (not illustrated) formed under the shutter release button 6, so the arresting lever 42 is swung counterclock wise upon depression of the shutter release button 6. Also, the arresting lever 42 is provided with an engaging claw 42b for engaging with teeth 7a formed on the periphery of the film advancing wheel 7 to prevent rotation of the film advancing wheel 7 until after an exposure has been made.

The sprocket wheel 45 with eight teeth is in engagement with perforations 16a of the photographic film 16 and its one rotation corresponds to advance of the photographic film 16 by one frame. A cam 48 is provided coaxially with the sprocket wheel 45 and has a groove 48a on its periphery. A distal end 42c of the arresting lever 42 is in contact with the periphery of the cam 48.

The shutter actuating lever 43 is rotatable about an axis 49 and is biased counterclockwise by the spring 47 whose one end is received by a spring receiving portion 43a of the shutter actuating lever 43. The shutter actuating lever 43 is formed on its upper portion with an integral projection 43b, which is brought into contact with a projection 42d of the arresting lever 42, whereby the shutter actuating lever 43 is prevented from swinging counterclockwise under the force of the spring 47. The shutter actuating lever 43 has an L-shaped arm 43c which is positioned in the vicinity of a claw 44a of the shutter blade 44.

The shutter blade 44 is mounted rotatably on a pin 50, is biased counterclockwise by a spring 51, and brought into contact with a stop 52 in an ordinary condition to close a shutter opening 53 completely. Upon depression of the shutter release button 6, the claw 44a of the shutter blade 44 is struck by the L-shaped arm 43c of the shutter actuating lever 43 to open and close the shutter opening 53. A lens holder 54 is provided in front of the shutter blade 44 to hold the taking lens 5 disposed in a position corresponding to the shutter opening 53.

A one-tooth gear 55 is formed integrally with the cam 48 to engage with teeth 41a formed on the periphery of the film frame counter disk 41. One rotation of the sprocket wheel 45 causes one rotation of the gear 55 to rotate the film frame counter disk 41 by one number or mark. The film frame counter disk 41 is provided on the upper surface thereof with numbers (not shown) which indicate the number of remaining or unexposed frames and which can be observed through the film frame counter window 9.

A triangular prism-shaped cam portion 7b is formed integrally on the upper surface of the film advancing wheel 7. A charge starting switch 56 connected to a flash circuit 28 is provided near the cam portio 7b. The charge starting switch 56 has two contacts 56a, 56b which are brought into contact with each other three times during one rotation of the film advancing wheel 6.

Referring again to FIG. 2, a printed circuit board 30 constituting the flash device is attached in front of the film supply chamber 19. A main capacitor 31 is behind the upper edge of the printed circuit board 30 and is wired thereto. The flash window 10 is provided on the upper portion of the printed circuit board 30 and is exposed to the outside through openings formed in the front cover 13 and the outer casing 4. A synchro switch 37 is mounted on the printed circuit board 30 at a lower portion thereof facing the photo-taking unit 40. The synchro switch 37 is in two contacts 37a, 37b, which are brought into contact with each other to turn on the synchro switch 37 by receiving pressure from an end portion of the shutter blade 44 at the time the shutter blade 44 is swung to completely open the shutter opening 53 upon depression of the shutter release button 6.

A lid 21 is formed integrally with and swingably on the rear cover 14 to close the bottom of the film take-up chamber 18, enabling easy removal of the cassette 17 containing the exposed photographic film 16 in a light-tight manner. A dry cell battery 36 is held by a holder 38 at a lower portion of the main body 12 and under the synchro switch 37.

Figure 4:
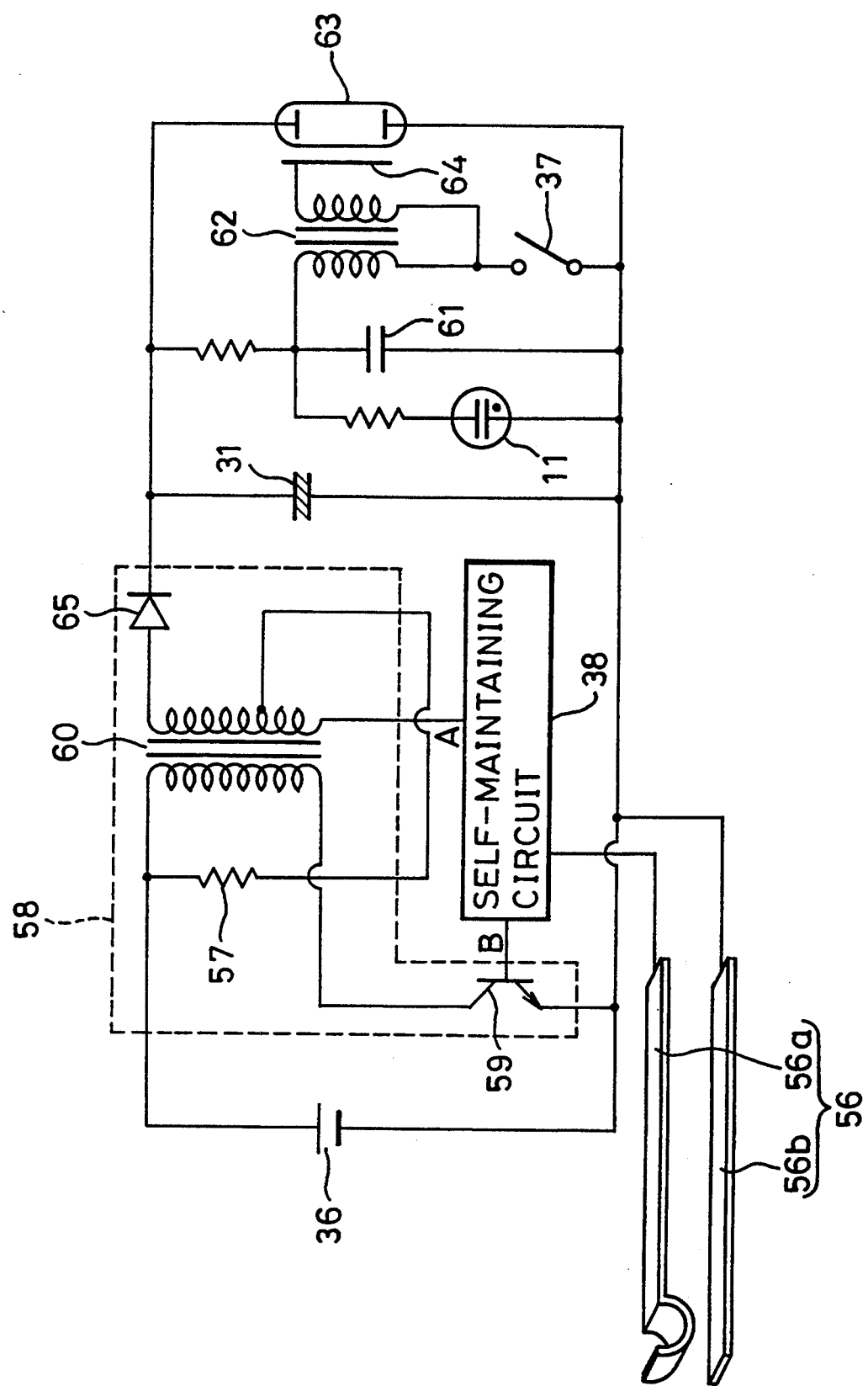
FIG. 4 is a circuit diagram of a flash device incorporated in the film unit.

In FIG. 4 illustrating the flash circuit 28, the charge starting switch 56 is connected between the battery 36 and a self-maintaining circuit 38. When the two contacts 56a, 56b are brought into contact with each other, the conductive state between points A and B is maintained to boost the voltage of the battery 36 by a DC-DC converter (booster) 58 to start charging the main capacitor 31 and a trigger capacitor 61. The trigger capacitor 61 is connected to a primary coil of a trigger transformer 62. A secondary coil of the trigger transformer 62 is connected to a trigger electrode 64 for starting discharge in a flash discharge tube 63. The DC-DC converter 58 is constituted of a transistor 59, a resistance 57, a transformer 60 and a diode 65. The transistor 59 repeats on and off states alternately to supply alternating current to the primary coil of the transformer 60, which causes high-voltage alternating current to be generated in the secondary coil. The alternating current generated in the secondary coil is converted to direct current by the diode 65.

The synchro switch 37 is connected in series to a primary coil of the trigger capacitor 61 and is turned on to discharge the trigger capacitor 61 upon opening of the shutter. A pilot lamp (neon lamp) 11 is connected in parallel to the trigger capacitor 61 in order to signal completion of charging of the main capacitor 31. The self-maintaining circuit 38 connected to the contact 56a of the charge starting switch 56 is provided for the purpose of keeping the conductive state between the points A and B, once the charge starting switch 56 is turned on. A relay, a thyrister or the like is used as the self-maintaining circuit 38.

The operation of the above-structured film unit will be described below. The film unit 2 is not in a shutter charged condition when on sale. After a user has purchased the film unit 2 to take photographs, the user needs first to rotate the film advancing wheel 7 to set the film unit to a shutter charged condition. When rotating the film advancing wheel 7 in the direction indicated by the arrow in FIGS. 2 and 3, the photographic film 16 is rewound frame by frame into the cassette 17, which causes the sprocket wheel 45 to be rotated since the sprocket wheel 45 engages with the perforations 16a of the photographic film 16. The rotation of the sprocket wheel 45 makes the shutter actuating lever 43 rotate clockwise via tile cam 48. Then, the shutter actuating lever 43 is positioned in a shutter charged position and is stopped by the arresting lever 42.

Simultaneously, the two contacts 56a, 56b of the charge starting switch 56 are pressed by the cam portion 7b of the film advancing wheel 7 into contact with each other. As soon as the charge starting switch 56 is turned on, the self-maintaining circuit 38 is placed in the on-state to boost tile voltage of the battery 36 with the DC-DC converter 58 to charge the main and trigger capacitors 31 and 61. When the main capacitor 31 is sufficiently highly charged, the pilot lamp 11 is lit to signal tile completion of charging.

After checking to see that tile pilot lamp 11 is lit, the user depresses the shutter release button 6. Upon depression of the shutter release button 6, the rod beneath the shutter release button 6 presses the bent arm 42a of the arresting lever 42 to swing the arresting lever 42 counterclockwise. The counterclockwise swinging of the arresting lever 42 causes the projection 43b of the shutter actuating lever 43 to disengage from the projection 42d of the arresting lever 42 and to be positioned in a cut-out 42e of the arresting lever 42, resulting in counterclockwise swinging of the shutter actuating lever 43. At this time, the claw 44a of the shutter blade 44 is struck by the L-shaped arm 43 of the shutter actuating lever 43.

When the shutter blade 44 opens the shutter opening 53 completely, the synchro switch 37 is turned on to allow the trigger capacitor 61 to be discharged. The discharged current is boosted by the trigger transformer 62 to apply high voltage to the trigger electrode 64 of the flash discharge tube 63. Thereby, the high-voltage charge stored in the main capacitor 31 is instantaneously discharged into the flash discharge tube 63 to emit a flash of light. The flash emitted by the flash discharge tube 63 proceeds forward through a diffusion plate of the flash window 10 to illuminate the subject.

Because the self-maintaining circuit 38 is kept in the on-state, the main and trigger capacitors 31 and 61 are again charged by the DC-DC converter 58. If the user desires to take another photograph, the film advancing wheel 7 is again rotated to execute a shutter charge. Then the above-described operation is repeated. Thus, this film unit 2 is always ready to perform flash photography.

Figure 5:
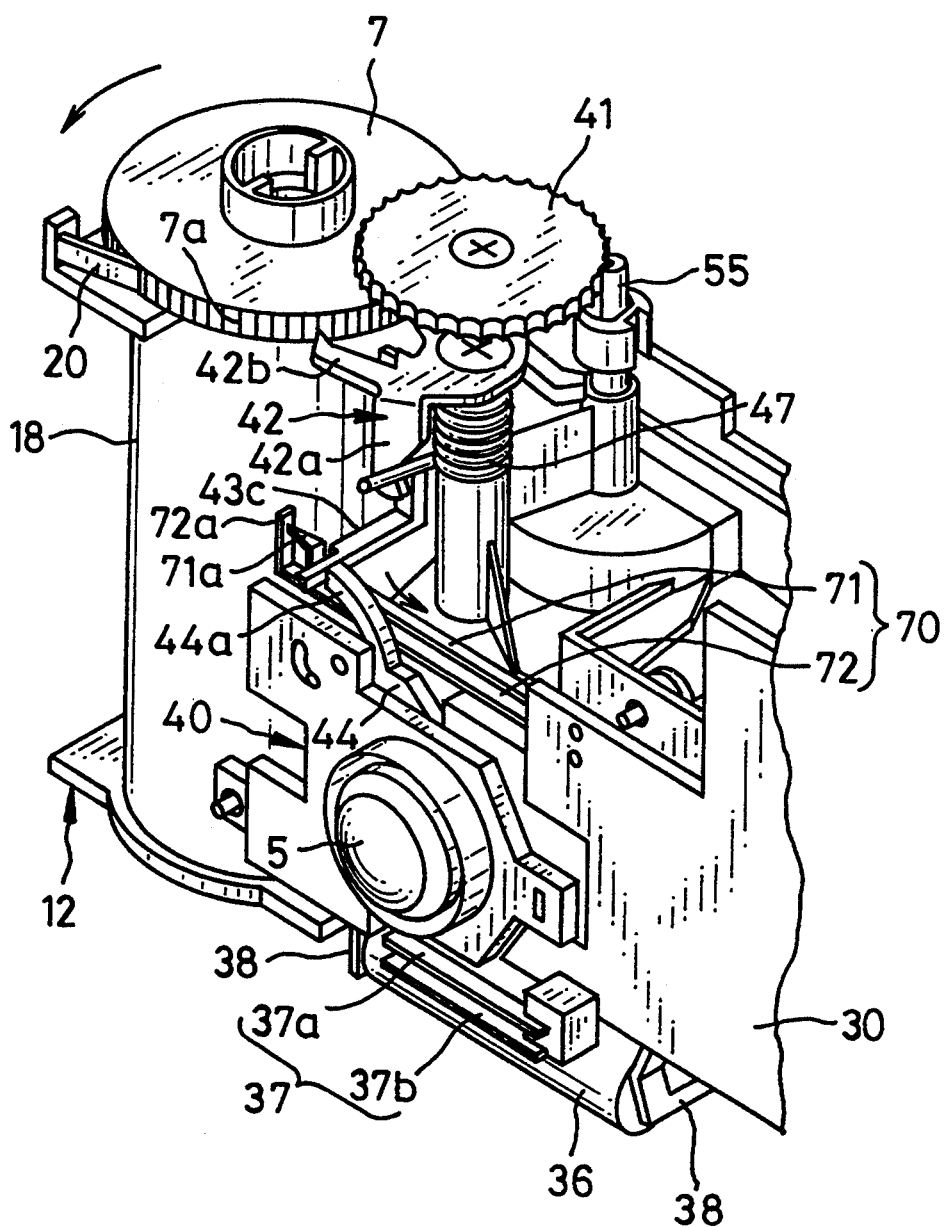
FIG. 5 is a fragmentary front perspective view illustrating another embodiment of this invention, wherein charging of the flash device is begun when the cocking of the shutter is completed.
Figure 6:
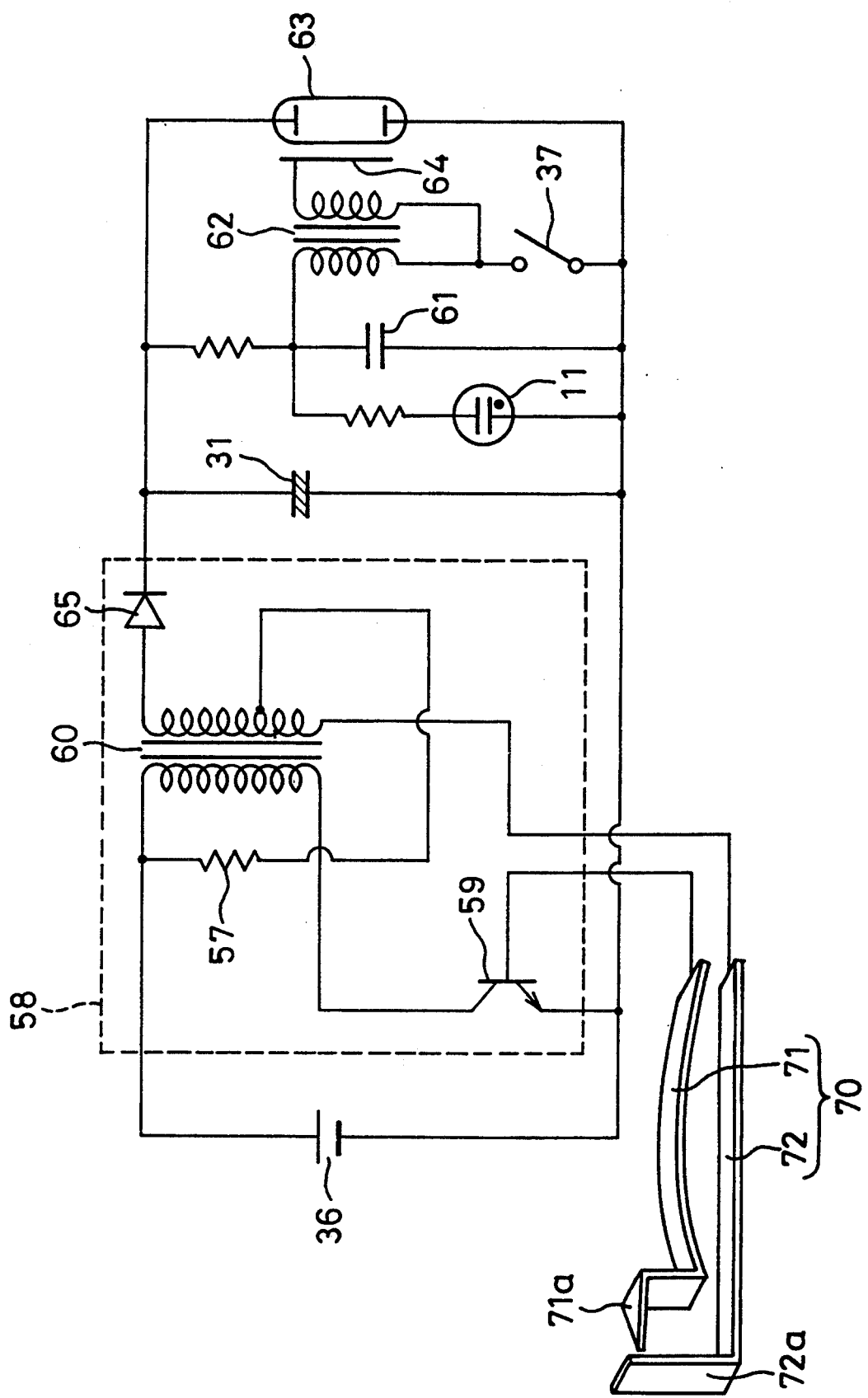
FIG. 6 is a circuit diagram of the flash device of FIG. 5.

FIGS. 5 and 6 show an embodiment of a charge switch which is attached to the printed circuit board. Elements similar to those of the above-described embodiment are represented by identical reference numerals. In FIG. 5, a charge switch 70 consisting of movable and stationary contacts 71 and 72 is attached to an upper portion of the printed circuit board 30. The movable contact 71 is positioned under the L-shaped arm 43c of the shutter actuating lever 43 and extends from the printed circuit board 30 beyond the arm 43c. The free end of the movable contact 71 is upturned to be an upstanding portion 71a. The stationary contact 72 is positioned below and parallel to the movable contact piece 71, and extends from the printed circuit board 30 to beyond the upstanding portion 71a. The free end of the stationary contact piece 72 is also upturned to be an upstanding portion 72a.

When the film advancing wheel 7 is rotated to move the arm 43c of the shutter actuating lever 43 to a shutter charged position, the upstanding portion 71a of the movable contact 71 is pushed by the arm 43c into contact with the upstanding portion 72a of the stationary contact 72 to turn on the charge switch 70. On the other hand, when the shutter release button 7 is depressed, the shutter actuating lever 43 is rotated counterclockwise, which causes the arm 43c to move away from the upstanding portion 71a, so that the upstanding portion 71a separates from the upstanding portion 72a because of its resiliency, to turn off the charge switch 70.

FIG. 6 illustrates a flash circuit having the charge switch 70, wherein the self-maintaining circuit is omitted. The charge switch 70 is connected to the secondary coil of the transformer 60 and the base of the transistor 59. While the charge switch 70 is turned on, the DC-DC converter 58 is activated to charge the main and trigger capacitors 31 and 61. The film unit of this embodiment is not in the shutter charged state while on sale but only after being sold.

Having bought the film unit, and desiring to take a photograph, the user first rotates the film winding wheel 6 to put the film unit into the shutter charged state. As a result, the charge switch 70 is turned on to cause the DC-DC converter 58 to be activated. Thereby, the chargings of the main and trigger capacitors 31 and 61 are begun. Then, when the shutter release button 6 is depressed after the user has noted the lighting of the pilot lamp 11, flash photography is carried out as described above. After the photograph is taken, the shutter actuating lever 43 is moved away from the charge switch 70, so that the DC-DC converter 58 is inactivated so as not to charge the main and trigger capacitors 31 and 61. But when the film advancing wheel 7 is rotated for the next photograph, the charging of the main and trigger capacitors 31 and 61 is repeated.

Although the charge switch 70 is turned on or off by making use of different positions of the shutter actuating lever 43 situated respectively at the time of shutter charging and after a shutter release in this embodiment, there may be used a dedicated switching member moved between first and second positions respectively at the time of shutter charging and after a shutter release to turn on the charge switch 70. Furthermore, the arresting member 42 or the like may be used for the same purpose in addition to the shutter actuating lever 43.

Figure 7:
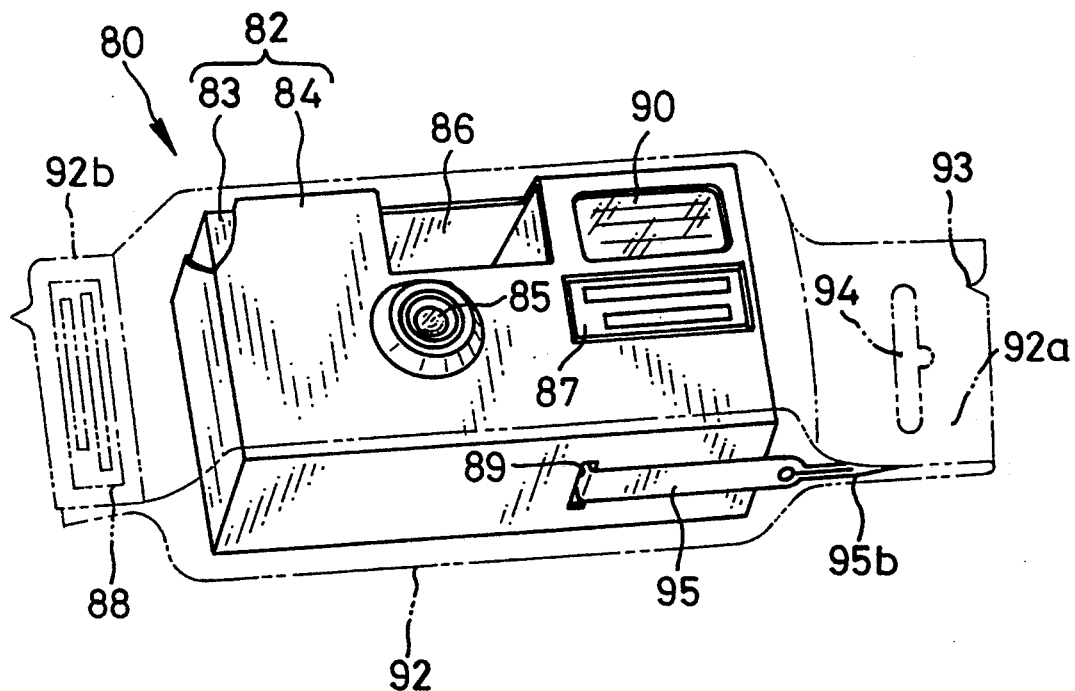
FIG. 7 is a schematic diagram of a wrapped lens-fitted photographic film unit according to an embodiment of this invention, wherein continuous charging of a flash device is begun immediately after the wrapping is torn off.

FIG. 7 shows another embodiment of a lens-fitted photographic film unit 80 according to the present invention, wherein the charging is executed upon removing a wrapper. The film unit 80 consists of a film unit 82 and a tubular wrapping in the form of a gusseted bag 92. The film unit 82 consists of a film housing 83 having a photograph-taking mechanism and an outer casing 84. The outer casing 84 has openings for exposing a taking lens 85, finder windows 86, and a flash window 90 or the like. Therefore, it is possible to take photographs with the film housing 83 encased in the outer casing 84. A first indicia portion 87 is provided on a portion of the outer casing 84 below the flash window 90. 113 the first indicia portion 87, there may be written the lifetime of the flash device incorporated in the film unit 82 such as e.g., "Lifetime of Flash Device: Usable till Dec. 20, 1994; after Unpackaging, within Two Months".

The wrapper 92 has light-shielding and moisture-proof properties, and its overall configuration is indicated by two-dot-dash lines. The wrapper 92 is made of a composite sheet, which has an aluminum sheet as a base whose front and rear surfaces are formed of layers such as polyethylene, terephthalate, and ethylene vinyl alcohol. First and second end portions 92a and 92b are sealed hermetically. A hang hole 94 is formed in the first end portion 92a to hang the film unit 80 on a hanger for display in a shop and a notch 93 is formed at the edge of the first end portion 92a so as to start the tearing of the wrapper 92. The second end portion 92b has a second indicia portion 88 on which the same information is written as in the first indicia portion 87.

Figure 8:
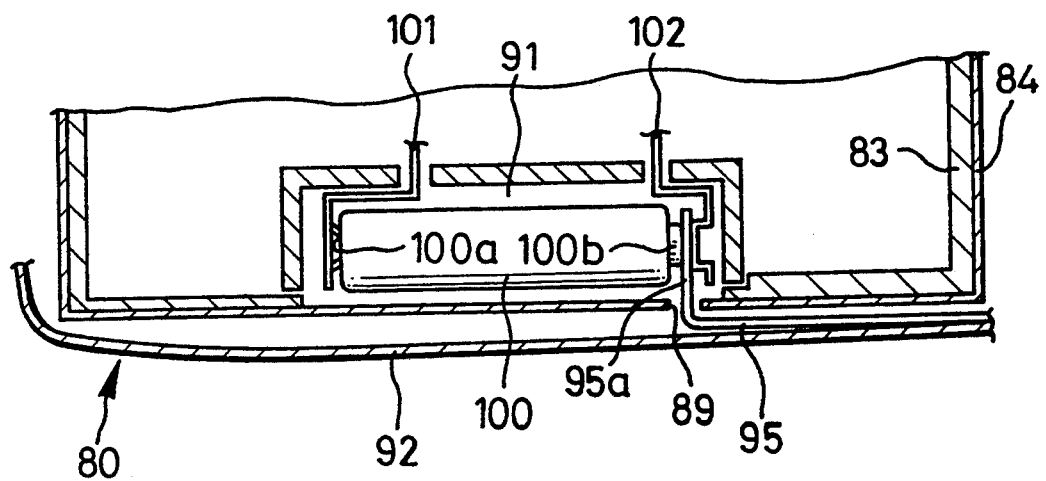
FIG. 8 is a fragmentary cross section of the wrapped film unit of FIG. 7.

Referring to FIG. 8, a negative contact segment 101 and a positive contact segment 102 are provided in a battery chamber 91 formed in the film housing 83. When a battery 100 is fitted into the battery chamber 91 to contact the negative and positive contact segment 101, 102, current flows in the flash circuit of the flash device. The battery 100 is of the AA-type and is discharged approximately two months after current starts flowing to the flash circuit.

In order to prevent current from flowing before tearing the wrapper 92 to use the film unit 82, a first end portion 95a of an insulating tape 95 is inserted between the positive contact segment 102 and the adjacent terminal 100b of the battery 100 through a slit 89 in the outer casing 84. The second end portion 95b of the insulating tape 95 is sealed between the layers of the first end portions 92a of the wrapper 92.

The film unit 80 is shipped from the factory in the FIG. 7 condition. At this time, the first end portion 95a of the insulating tape 95 is disposed between the battery 100 and the positive contact segment 102 so that current will not flow to the flash circuit. In this condition, the battery 100 will discharge only only very slowly because of natural discharge, and e.g., the film unit 82 will be usable for two years after its manufacture. Therefore, there is written the lifetime of the flash device due to natural discharge of the battery 100, in the first and second indicia portions 87 anti 88, in terms of the year and month.

Figure 9:
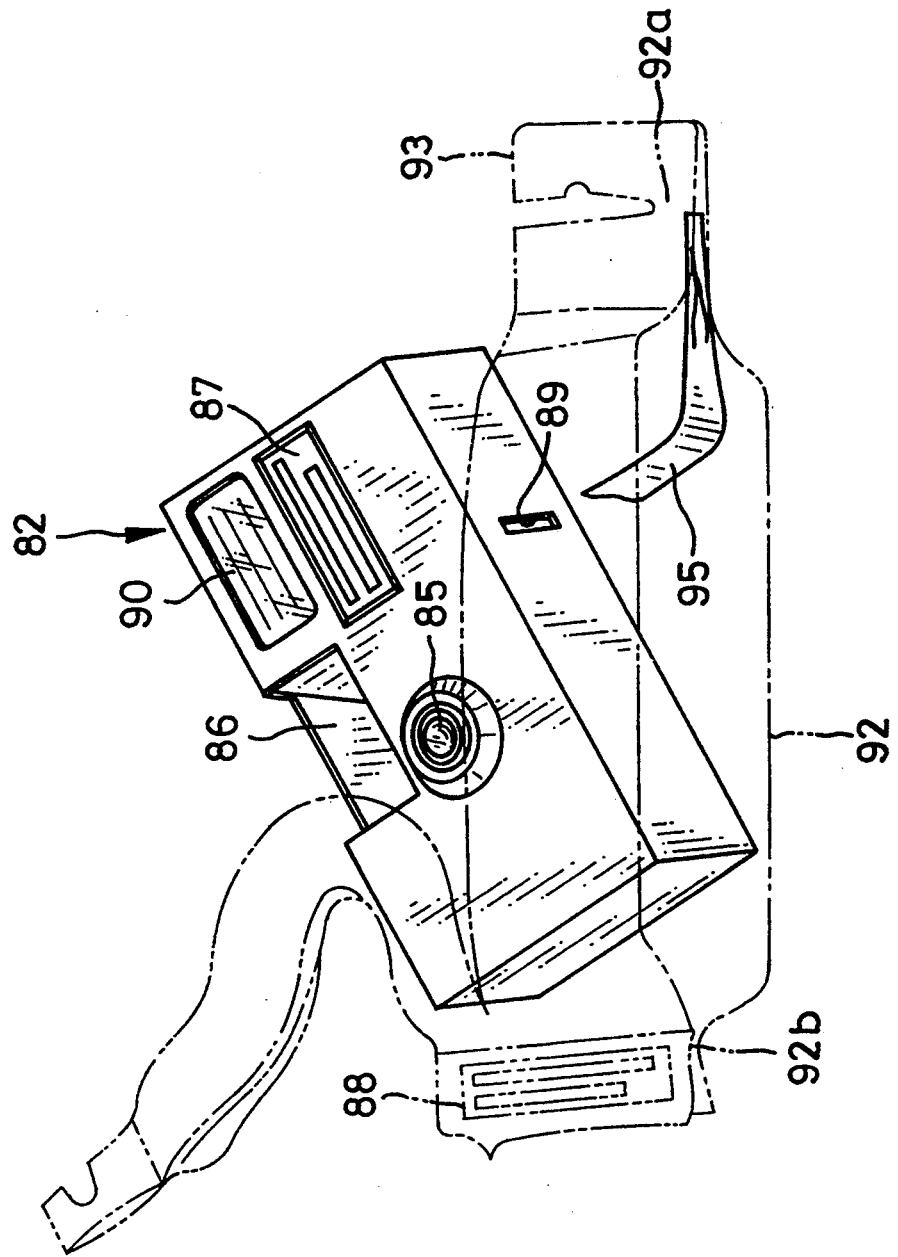
FIG. 9 is an explanatory view illustrating a state wherein the wrapping is torn off to remove the film housing.

After purchasing the film unit 80, the wrapper 92 is first torn off starting from the notch 93, to take out the film unit 82, as illustrated in FIG. 9. At this time, since the second end portion 95b of the insulating tape 95 is attached to the first end portion 92a of the wrapping 92, the end 95a of the insulating tape 95 is pulled from between the terminal 100b of the battery 100 and the positive contact segment 102, and drawn out through the slot 89. As a result, the flash circuit is energized by the battery 100. Thereby, the main and trigger capacitors become charged. Thereafter, current will continue to flow to the flash circuit, so that a flash will be emitted every time the shutter release button is depressed to take a photograph.

After unwrapping, if the film unit 82 is left unused, the main and trigger capacitors are kept charged. In this condition, the battery 100 is gradually discharged owing to natural discharge from the capacitors or leakage current from the flash circuit and then its lifetime is about two months.

In this embodiment, the second end portion 95b of the insulating tape 95 is sealed together with the first end portion 92a of the wrapping 92 but may be sealed together with the second end portion 92b. Also, other insulating members can be substituted for the insulating tape 95, if they can be attached to the wrapper 92. The present invention can be applicable to a film unit having a flash inhibit switch to be turned off when no flash photography is desired.

The charge starting switch 56 in FIG. 4 may be turned on or off by the shutter actuating lever 43, as is the charge switch 70 in FIG. 5. The charge starting switch or the charge switch in the above embodiment may be applicable to a compact camera having a film advancing member for manually winding a photographic film.

Furthermore, various changes and modifications will be apparent to those having skill in this art, and unless such modifications depart from the scope of the present invention, as defined by the appended claims, they should be construed as being included therein.

What is claimed is:

1. A lens-fitted photographic film unit including photographic film preloaded therein, a photograph-taking mechanism for forming an image of a subject on said photographic film, a flash device for projecting a flash of light to said subject, a battery for supplying said flash device with electrical energy, and first and second terminals in contact with first and second electrodes of said battery for connecting said battery with said flash device electrically;

a wrapper containing said lens-fitted photographic film unit, said wrapper being adapted to be torn in order to remove said lens-fitted photographic film unit; and an insulating material having first and second end portions, said first end portion being removably inserted between said first electrode and said first terminal to prevent said first electrode and said first terminal from being in electrical connection, said second end portion being fixed on said wrapper, whereby when said wrapper is removed from said lens-fitted photographic film unit, said first end portion is drawn from between said first electrode and said first terminal so as to connect said first electrode electrically with said first terminal.

2. A lens-fitted photographic film unit as recited in claim 1, wherein said insulating material is insulating tape, and said second end portion is attached to an inside of said wrapper.

3. A lens-fitted photographic film unit as recited in claim 1, wherein said lens-fitted photographic film unit is constituted of a film housing and an outer casing covering said film housing, and said film housing contains said photographic film, said photograph-taking mechanism, said flash device, said battery, and said first and second terminals.

4. A lens-fitted photographic film unit as recited in claim 3, wherein a bottom of said film housing has an open battery chamber containing said battery, and said first and second terminals are inside said battery chamber.

5. A lens-fitted photographic film unit as recited in claim 4, wherein said battery chamber is covered by a portion of said outer casing, and said portion is provided with a slot for drawing said first end portion out of said battery chamber.

6. A lens-fitted photographic film unit as recited in claim 1, wherein an outside of said wrapper is provided with indicia designating a term in which said flash device is usable.

7. A lens-fitted photographic film unit as recited in claim 3, wherein an outside of said outer casing is provided with indicia designating a term in which said flash device is usable.

* * * * *